United States Patent
Ramamoorthy et al.

(10) Patent No.: US 12,476,959 B2
(45) Date of Patent: Nov. 18, 2025

(54) SECURE TUNNELLING OF A FRAME IN AN IN-VEHICLE COMMUNICATION NETWORK

(71) Applicant: Infineon Technologies AG, Neubiberg (DE)

(72) Inventors: Anjana Ramamoorthy, Munich (DE); Alexander Zeh, Munich (DE)

(73) Assignee: Infineon Technologies AG, Neubiberg (DE)

( * ) Notice: Subject to any disclaimer, the term of this patent is extended or adjusted under 35 U.S.C. 154(b) by 161 days.

(21) Appl. No.: 18/065,430

(22) Filed: Dec. 13, 2022

(65) Prior Publication Data

US 2024/0195799 A1 Jun. 13, 2024

(51) Int. Cl.
*H04L 9/40* (2022.01)

(52) U.S. Cl.
CPC .................. *H04L 63/083* (2013.01)

(58) Field of Classification Search
CPC ..................................... H04L 63/083
See application file for complete search history.

(56) References Cited

U.S. PATENT DOCUMENTS

| | | | |
|---|---|---|---|
| 12,021,879 B2 * | 6/2024 | Nelson | H04L 12/40 |
| 2009/0025079 A1 * | 1/2009 | Tanizawa | H04L 63/08 726/14 |
| 2015/0195178 A1 | 7/2015 | Bhattacharya et al. | |
| 2018/0062988 A1 * | 3/2018 | Sikaria | H04L 12/4633 |
| 2018/0160339 A1 * | 6/2018 | Wu | H04L 5/0035 |
| 2020/0244442 A1 * | 7/2020 | Zeh | H04L 9/3242 |
| 2021/0044573 A1 * | 2/2021 | Chauhan | H04W 12/033 |
| 2022/0094684 A1 * | 3/2022 | Komedani | H04L 63/123 |
| 2022/0131839 A1 * | 4/2022 | Potter | G06F 21/85 |
| 2022/0174044 A1 * | 6/2022 | Konda | H04L 63/0442 |
| 2022/0247681 A1 * | 8/2022 | Melgangolli | H04L 12/40 |
| 2023/0188983 A1 * | 6/2023 | Rigelsford | H04L 9/0631 713/168 |

OTHER PUBLICATIONS

M. J. Dworkin, "SP 800-38D. Recommendation for Block Cipher Modes of Operation: Galois/Counter Mode (GCM) and GMAC," National Institute of Standards & Technology, Gaithersburg, MD, United States, Nov. 2007, 39 pages.
R. Beaulieu et al., "SIMON and SPECK: Block Ciphers for the Internet of Things," National Security Agency, Fort Meade, MD, United States, Jul. 2015, 15 pages.
J. Schaad et al., "Advanced Encryption Standard (AES) Key Wrap Algorithm," Internet Engineering Task Force, Request for Comments RFC 3394, RSA Laboratories, Sep. 2002, 41 pages.

(Continued)

*Primary Examiner* — Dhairya A Patel
(74) *Attorney, Agent, or Firm* — Harrity & Harrity, LLP

(57) ABSTRACT

A controller may receive a set of messages provided by one or more network nodes included in an in-vehicle communication network. The controller may determine a security pattern associated with generating a tunnel frame including the set of messages. The controller may identify one or more messages from the set of messages based on the security pattern. The controller may compute a tunnel frame message authentication code (TMAC) based on one or more characteristics of the one or more messages. The controller may generate the tunnel frame, the tunnel frame including the TMAC and the set of messages.

24 Claims, 11 Drawing Sheets

(56) References Cited

OTHER PUBLICATIONS

"IEEE Standard for Local and Metropolitan Area Networks-Port-Based Network Access Control," IEEE Std 802.1X-2020 (Revision of IEEE Std 802.1X-2010 Incorporating IEEE Std 802.1Xbx-2014 and IEEE Std 802.1Xck-2018), Feb. 2020, pp. 1-289.
Extended European Search Report for European Application No. EP23212721 dated Aug. 6, 2024, 12 pages.
Extended European Search Report for European Application No. EP232127217 dated Feb. 19, 2025, 13 pages.

* cited by examiner

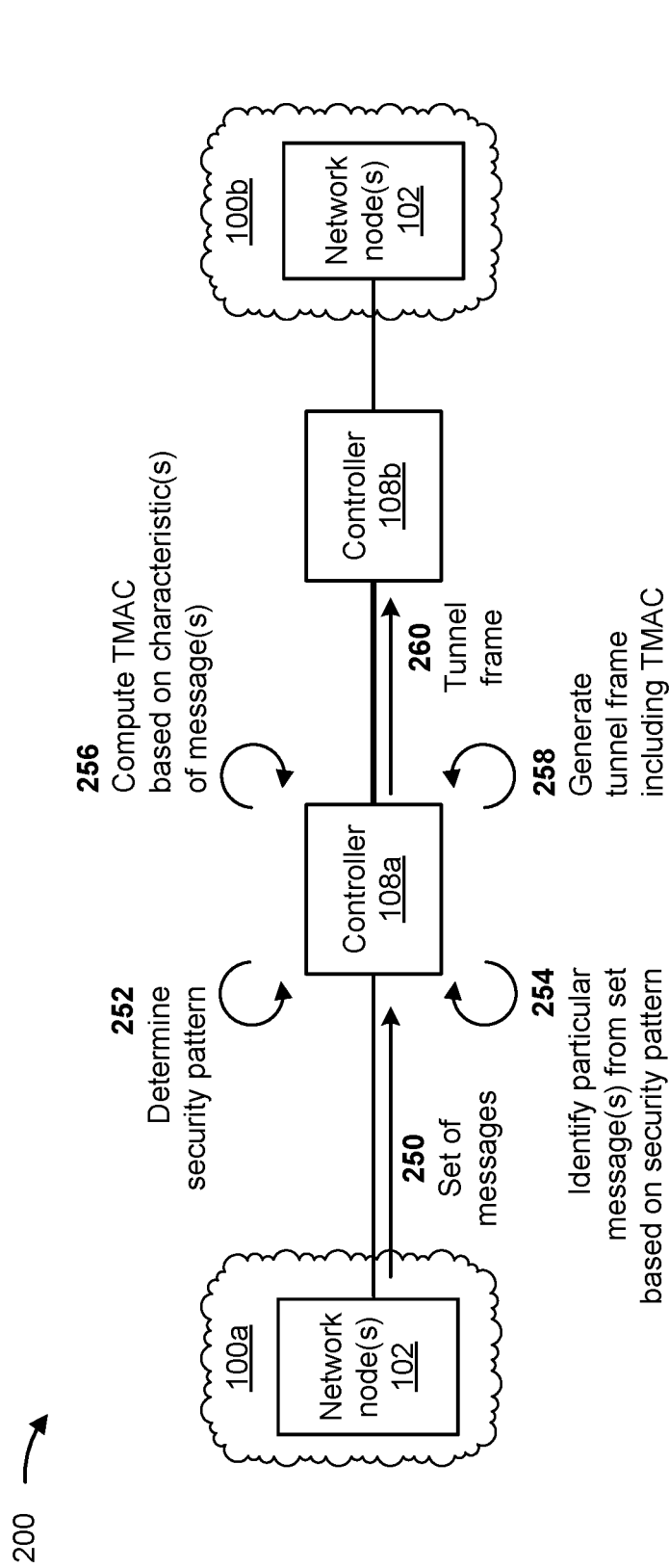
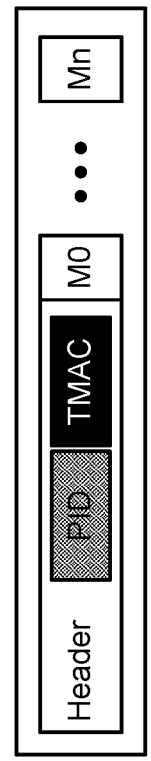
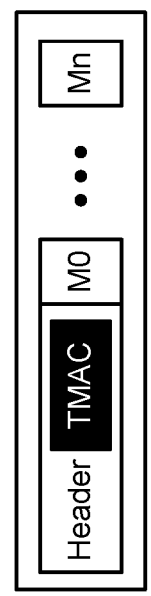
FIG. 2A
FIG. 2C
FIG. 2B

SECURE TUNNELLING OF A FRAME IN AN IN-VEHICLE COMMUNICATION NETWORK

BACKGROUND

A bus-based communication system is a system comprising one or more communication buses that interconnect network nodes of a communication network. An individual network node can include, for example, a sensor, an actuator, a controller, and/or another device that is used by the system to perform a function. An in-vehicle communication network may comprise one or more bus-based communication systems. In an in-vehicle communication network, a network node can correspond to a sensor, an actuator, and/or an electronic control unit (ECU) (e.g., an engine control module (ECM), a powertrain control module (PCM), a transmission control module (TCM), a brake control module (BCM), a central control module (CCM), a central timing module (CTM), a general electronic module (GEM), a body control module (BCM), a suspension control module (SCM), and/or the like) that performs operations associated with a function of a vehicle. Network nodes within a bus-based communication system communicate with one another via the communication bus using strings of bits, or frames, that are serially transmitted and/or received according to a message-based communication protocol. One type of protocol used in bus-based systems is a controller area network (CAN) protocol. The CAN protocol can be used for in-vehicle communication networks in vehicles (e.g., road vehicles, off-road vehicles, marine vehicles, aerial vehicles, and/or the like), and can also be used for other applications (e.g., industrial systems, medical systems, robotics systems, and/or the like). The CAN protocol may facilitate safe operation of a vehicle by providing reliable message delivery, non-conflicting messages, and acceptable delivery time, while also being relatively low cost and noise resilient, and supporting redundant routing. Variants of the CAN protocol include CAN extra-long (CAN XL) protocol and CAN flexible data-rate (CAN FD) protocol.

SUMMARY

In some implementations, an in-vehicle communication network controller includes one or more components configured to: receive a set of messages provided by one or more network nodes included in an in-vehicle communication network: determine a security pattern associated with generating a tunnel frame including the set of messages: identify one or more messages from the set of messages based on the security pattern: compute a tunnel frame message authentication code (TMAC) based on one or more characteristics of the one or more messages: and generate the tunnel frame, the tunnel frame including the TMAC and the set of messages.

In some implementations, an in-vehicle communication network controller includes one or more components configured to: receive a set of messages provided by one or more network nodes included in an in-vehicle communication network: identify one or more message freshness values associated with determining a tunnel frame freshness value, the one or more message freshness values being included in a corresponding one or more messages of the set of messages: determine the tunnel frame freshness value based on one or more message freshness values: and generate a tunnel frame, the tunnel frame including the tunnel frame freshness value and the set of messages.

In some implementations, an in-vehicle communication network controller includes one or more components configured to: receive a set of messages provided by one or more network nodes included in an in-vehicle communication network: encrypt a set of headers associated with the set of messages to generate a set of encrypted headers associated with the set of messages, each header in the set of headers being encrypted separately from other headers in the set of headers: and generate a tunnel frame, the tunnel frame including the set of encrypted headers and the set of messages.

BRIEF DESCRIPTION OF THE DRAWINGS

FIGS. 2A-2C are diagrams illustrating an example associated with secure tunneling of a frame in an in-vehicle communication network.

DETAILED DESCRIPTION

The following detailed description of example implementations refers to the accompanying drawings. The same reference numbers in different drawings may identify the same or similar elements.

As described above, a bus-based communication system may include a network of one or more communication buses that interconnect network nodes of a communication network (e.g., an in-vehicle system, a vehicle system, an industrial system, a medical system, a robotics system, and/or the like). A network node may include, for example, a sensor, an actuator, a controller, or another device that is used to perform a function of the associated system. In a vehicle, for instance, a network node may correspond to a sensor, an actuator, or an ECU that is associated with a throttle function, a steering function, a braking function, a gear selection function, and/or another function of the vehicle.

In general, a network node of a bus-based communication system may communicate with other network nodes on a communication bus via frames (e.g., strings of bits) that are serially transmitted and/or received according to a message-based communication protocol. For example, a network node may transmit a frame of dominant and/or recessive bits that can be interpreted by another network node as information provided via a sensor, information for controlling an actuator, an operating parameter, or an operating condition, among other examples.

Figure 1A:
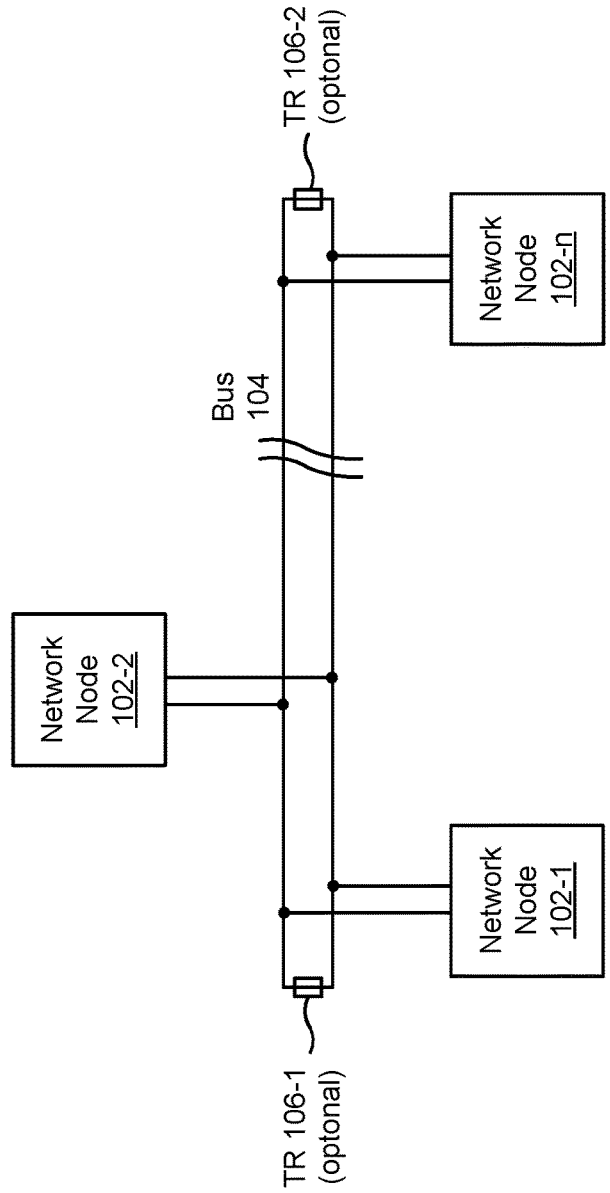
FIG. 1A is a diagram illustrating an example of a bus-based communication system.

FIG. 1A is a diagram illustrating an example of a bus-based communication system 100. FIG. 1A illustrates an example of a bus-based communication system 100 connecting a group of network nodes 102 (e.g., network node 102-1 through network node 102-$n$ (n>1)). In the example of FIG. 1A, a communication bus 104 is shown as a two-line bus system, which may be implemented as two differential lines. Notably, other implementations of a communication bus are possible. In bus-based communication system 100, a network node 102 may selectively apply a direct current (DC) voltage signal across the bus terminals to transmit a dominant bit or a recessive bit. For example, a network node 102 may transmit a dominant bit (e.g., a logical "0" bit) by driving the high bus terminal to a high voltage (e.g., 5 volts DC (VDC)) and by driving the low bus terminal to a low voltage (e.g., 0 VDC), and may transmit a recessive bit (e.g., a logical "1" bit) by driving neither bus terminal. The bus terminals may extend between the network nodes 102 and enable information (e.g., information provided via a sensor, information for controlling an actuator, an operating parameter, or an operating condition, among other examples) to be communicated between the network nodes 102. As further shown in FIG. 1A, the bus-based communication system 100 may be terminated with (optional) termination resistors 106-1 and 106-2, which may serve to reduce reflections on the communication bus 104 that could otherwise affect signal quality along the communication bus 104.

In some cases, the network nodes 102 of the bus-based communication system 100 may communicate with one another according to a message-based communication protocol. For example, the network node 102-1 may transmit a message as a frame of bits that are serially introduced into the communication bus 104 and serially received by the network node 102-2. A frame may generally include one or more designated fields that provide different types of information relating to the message contained in the frame. Notably, in the bus-based communication system 100, a message transmitted by any network node 102 is broadcast on the communication bus 104, meaning that any other network node 102 can receive the message on the communication bus 104.

Examples of protocols that may be used in a bus-based communication system 100 include CAN protocol, CAN FD protocol, CAN XL protocol, local interconnect network (LIN) protocol, and an Ethernet protocol (e.g., 10 base-T1S protocol). Notably, while implementations described herein are described in the context of CAN variants, such as CAN XL, the techniques described herein may be applied to other types of bus-based communication systems.

An in-vehicle communication network may include one or more bus-based communication systems 100. A bus-based communication system 100 in an in-vehicle communication network may have particular attributes reflecting requirements for in-vehicle networks. As an example, an in-vehicle bus-based communication system 100 may support communication of sensor data to a control unit by data frames being transmitted from the sensor or a control unit of the sensor to a control unit on a higher level. A particular protocol may be used for the data frames or protocol frames communicated between individual network nodes or participants of the bus-based communication system 100. In return or in response to receipt of sensor data, the control unit of the sensor or the control unit on the higher level may communicate information associated with an action to an actuator coupled to the bus. As a particular example, with reference to FIG. 1A, network node 102-1 may represent an angle sensor measuring an angle of a brake pedal. Network node 102-1 may transmit information indicating the measured angle in one or more protocol frames to network node 102-2, which may be an ECU. In response to receiving the information associated with the angle, the network node 102-2 may transmit one or more bus frames to network node 102-$n$, which may be a brake actuator. These frames, when received by the network node 102-$n$, may cause a braking action. Bus-based communications related to such an action are time critical and, therefore, should be transmitted, received, and processed quickly (e.g., in real-time or near real-time). Such timing requirements are not common in a typical communication network.

Further, in-vehicle communication networks typically have a well-defined number of network nodes that, generally, remain constant over a lifetime of a vehicle. Likewise, existing links between individual network nodes are not likely to be altered over the lifetime of the vehicle and, therefore, a topology of a given bus-based communication system 100 in an in-vehicle communication network is likely to remain constant. In a conventional computer network, such a situation is unlikely.

In a bus-based communication system 100, authenticity of a protocol frame transmitted over the communication bus 104 may be desirable, particularly in association with controlling a function of a vehicle. Taking a braking action as an example, a command causing an emergency braking should not be mistaken for a gentle braking when parking the vehicle in a controlled manner. To this end, an indication of authenticity of a frame communicated between participants of the bus-based communication system is advantageous. In some cases, authenticity of a frame can be provided at a data link layer (layer 2) of a given network node 102. In general, indicating authenticity of a protocol frame on a data link layer eliminates involvement of higher layers in authentication of (time-critical) commands communicated between participants of the bus-based communication system.

Further, with increasingly capable entertainment systems and increasing vehicle-to-vehicle communications, there is an increasing susceptibility to malicious commands or protocol frames being injected to a bus-based communication system 100 in an in-vehicle communication network. Therefore, bus-based communication system 100 may be configured to provide data security for frames (e.g., to prevent injection of the malicious frames). In some cases, data security can be provided at the data link layer or at a transport layer (layer 3). In some cases, data security may be provided on one or more other layers (e.g., one or more upper or lower layers) other than the transport layer and the data link layer.

The number and arrangement of devices shown in FIG. 1A are provided as examples. In practice, there may be additional devices, fewer devices, different devices, or differently arranged devices than those shown in FIG. 1A. Furthermore, two or more devices shown in FIG. 1A may be implemented within a single device, or a single device shown in FIG. 1A may be implemented as multiple, distributed devices. Additionally, or alternatively, a set of devices (e.g., one or more devices) of FIG. 1A may perform one or more functions described as being performed by another set of devices of FIG. 1A. For example, while bus-based communication system 100 is shown with two bus terminals, the communication bus 104 may interconnect the network nodes 102 using a different number of bus terminals and/or using a different arrangement of bus terminals that interconnect a different arrangement of network nodes 102. As another example, the communication bus 104 may be arranged in another topology, such as a ring topology (e.g., in which ends of the communication bus are electrically coupled to a single master unit). As another example, the communication bus 104 may comprise a plurality of communication buses 104 and/or be in selective communication with one or more additional communication buses 104.

Figure 1B:
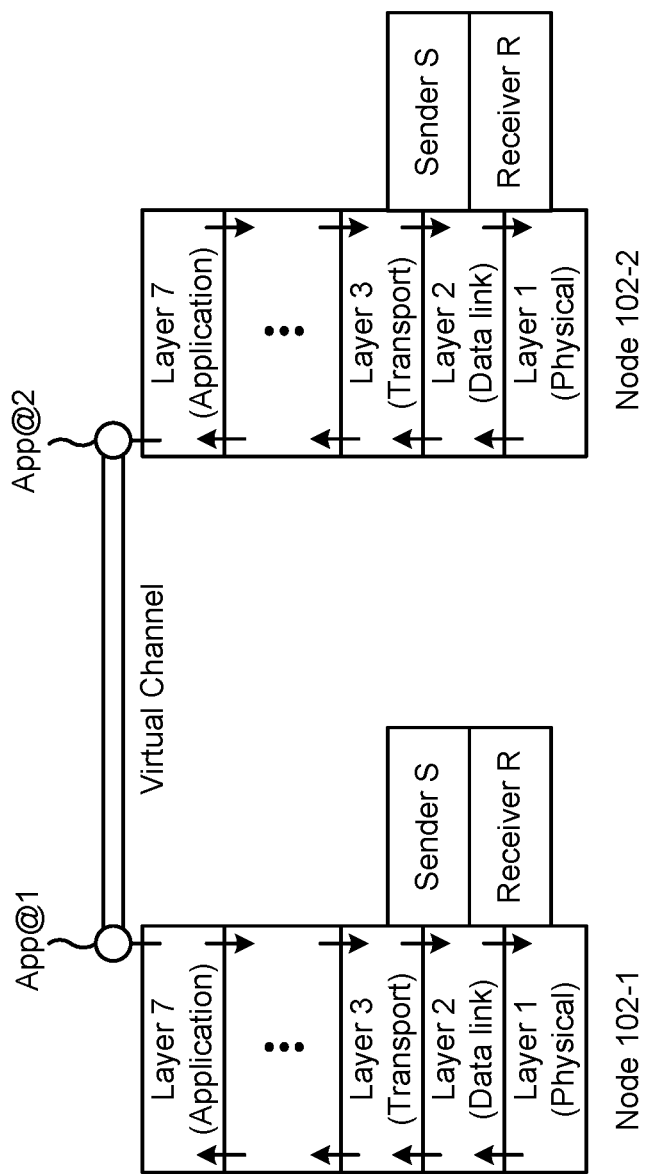
FIG. 1B illustrates an example of a communication stack and virtual channels between a pair of network nodes of a bus-based communication system.

FIG. 1B illustrates an example of a communication stack and virtual channels between a pair of network nodes 102 of a bus-based communication system 100, with network node 102-1 and network node 102-2 being shown as an example. As shown in FIG. 1B, communication between network node 102-1 and network node 102-2 flows in layers that can be categorized according to, for example, the OSI-ISO layer model. The lowest level layer (layer 1) is referred to as the physical layer. Each layer in the model can accept an order from a higher layer, perform some action at its level, and trigger a task in a lower layer by forwarding a request to the lower layer. For example, a command to the data link layer (layer 2) may be received from the transport layer (layer 3), as indicated by the downward arrow between the transport layer and the data link layer. Similarly, a command to the physical layer (layer 1) may be received from the data link layer, as indicated by the downward arrow between the physical layer and the data link layer. The physical layer of network node 102-1 may use a connection or link to network node 102-2 in order to communicate data on the physical layer to network node 102-2. Similarly, network node 102-1 may receive data from network node 102-2 over the physical link between network node 102-1 and network node 102-2. Here, the physical layer of network node 102-1 may forward the received data to the data link layer and, after processing at the data link layer, the data link layer may forward data to the transport layer. This forwarding is indicated by the upward arrow between the physical layer and the data link layer of network node 102-1 and the upward arrow between the data link layer and the transport layer of network node 102-1. The protocol flow in network node 102-2 is similar to that of network node 102-1. Notably, some existing bus-based communication networks within in-vehicle communication networks do not follow the separation of the physical layer and the data link layer as suggested in the OSI-ISO model. To reflect this, a sender S and receiver R are depicted in FIG. 1B as extending over the physical layer and the data link layer.

In some cases, techniques for providing authenticity of data communication in vehicles are implemented in the application layer (layer 7) using a software stack, indicated as App@1 and App@2 in FIG. 1B. Further, it may be useful to introduce a concept of virtual channels between network node 102-1 and network node 102-2 to indicate an authenticated and/or protected communication between two or more participants using the software stacks App@1 and App@2. One example associated with providing security for onboard networks, in a vehicle using software stacks, is secure onboard communication (SEC OC) according to the automotive open system architecture (AUTOSAR) standard. In some bus-based communication systems 100, functionality pertaining to authenticity and/or data security is limited to one or two lower layers of an individual network node 102 of the bus-based communication system 100. Limiting the authenticity and/or data security functionality to, for example, the data link layer and/or the transport layer may eliminate a need for higher protocol layers to be involved in data integrity and/or data security operations, thereby reducing an amount of time needed to receive, transmit, or process a given communication over the bus-based communication system 100.

The number and arrangement of layers shown in FIG. 1B are provided as one or more examples. In practice, there may be additional layers, fewer layers, different layers, or differently arranged layers than those shown in FIG. 1B. Furthermore, two or more layers shown in FIG. 1B may be implemented within a single layer, or a single layer shown in FIG. 1B may be implemented as multiple, distributed layers. Additionally, or alternatively, a set of layers (e.g., one or more layers) of FIG. 1B may perform one or more functions described as being performed by another set of layers of FIG. 1B.

Figure 1C:
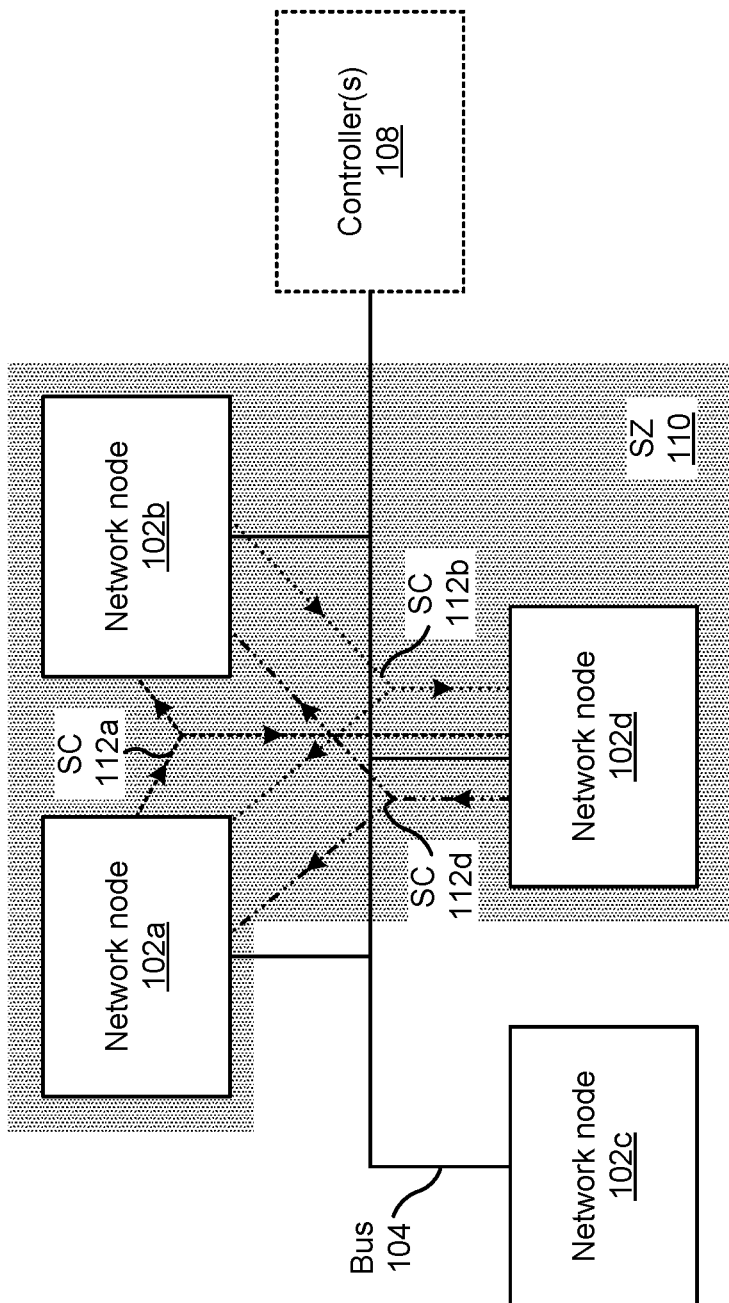
FIG. 1C is a diagram illustrating an example of an environment that enables secure communication between network nodes of an in-vehicle communication network comprising one or more bus-based communication systems.

FIG. 1C is a diagram illustrating an example of an environment that enables secure communication between network nodes 102 as described herein. As shown, the example bus-based communication system 100 in FIG. 1C includes a plurality of network nodes 102 (e.g., network nodes 102a through 102d are shown in FIG. 1C) and one or more controllers 108 connected to the communication bus 104. In some implementations, two or more network nodes 102 shown in FIG. 1C may be included in the same bus-based communication system 100. In some implementations, two or more network nodes 102 shown in FIG. 1C may spread across multiple bus-based communication systems 100 (e.g., two or more bus-based communication systems 100 that are connected by one or more controllers 108).

A controller 108 is a device configured to control or manage operation of one or more network nodes 102 of one or more bus-based communication systems 100. For example, the controller 108 may be configured to receive a message from a first network node 102 (e.g., network node 102a), where the message is destined for a second network node 102 (e.g., network node 102b). The controller 108 may determine a priority of the message based at least in part on one or more characteristics of the message, and may provide the message to an output buffer for transmission to the second network node 102 based at least in part on the priority of the message, as described herein. In some implementations, the controller 108 may be configured to control or manage operation of one or more network nodes 102 within a single bus-based communication system 100 or a plurality of network nodes 102 across multiple bus-based communication systems 100 that are connected via the controller 108.

As shown in FIG. 1C, one or more network nodes 102 of the one or more bus-based communication systems 100 may be included a secure zone (SZ) 110 defined by a set of secure channels (SCs) 112. In the example shown in FIG. 1C, network node 102a, network node 102b, and network node 102d are included in the SZ 110, and the SZ 110 includes an SC 112a, an SC 112b, and an SC 112d. In some implementations, the SZ 110 may be within a single bus-based communication system 100 or may span multiple bus-based communication systems 100 (e.g., through one or more gateways). As indicated above, the SZ 110 may be defined by a set of SCs 112 that enable network nodes 102 to securely transmit and receive communications.

In some implementations, an SC 112 is a unidirectional transmission channel. In some implementations, an SC 112 is a point-to-multipoint transmission channel. Alternatively, an SC 112 may in some implementations be a point-to-point transmission channel. In the example shown in FIG. 1C, the SC 112a is a unidirectional, point-to-multipoint channel that enables the network node 102a to transmit secure communications to the network node 102*b* and the network node 102*d*. Similarly, the SC 112*b* is a unidirectional, point-to-multipoint channel that enables the network node 102*b* to transmit secure communications to the network node 102*a* and the network node 102*d*. Further, the SC 112*d* is a unidirectional, point-to-multipoint channel that enables the network node 102*d* to transmit secure communications to the network node 102*a* and the network node 102*b*. In some implementations, each SC 112 of the SZ 110 is associated with an SC identifier (SCI) that is unique within the one or more bus-based communication systems 100.

In some implementations, an SC 112 may have one or more secure associations (SAs). An SA is a security parameter of the SC 112 based on which a security key can be identified. In some implementations, a given SC 112 may have multiple SAs (e.g., two SAs).

The number and arrangement of layers shown in FIG. 1C are provided as one or more examples. In practice, there may be additional layers, fewer layers, different layers, or differently arranged layers than those shown in FIG. 1C. Furthermore, two or more layers shown in FIG. 1C may be implemented within a single layer, or a single layer shown in FIG. 1C may be implemented as multiple, distributed layers. Additionally, or alternatively, a set of layers (e.g., one or more layers) of FIG. 1C may perform one or more functions described as being performed by another set of layers of FIG. 1C.

As vehicle functions supported by network nodes 102 in in-vehicle communication networks including one or more bus-based communication systems 100 evolve, security requirements increase so as to ensure safe and secure operation with respect to communication among the network nodes 102. In some scenarios, to support communication between network nodes 102 of an in-vehicle communication network, a frame may need to be tunneled. For example, a first network node 102 may be included in a first bus-based communication system 100 (e.g., a first CAN network) that is connected to a first controller 108 and a second network node 102 may be included in a second bus-based communication system 100 (e.g., a second CAN network) that is connected to a second controller 108, with the first controller 108 and the second controller 108 being connected over another type of network (e.g., an Ethernet-based network). Here, if the first network node 102 needs to transmit a message to the second network node 102, the message needs to be tunneled over the connection between the first controller 108 and the second controller 108. To improve message security, it may be desirable to generate a secure tunnel frame, including the message, for communication of the message between the first controller 108 and the second controller 108.

Some implementations described herein provide techniques and apparatuses associated with secure tunneling of a frame in an in-vehicle communication network comprising one or more bus-based communication systems 100. For example, a controller (e.g., a controller 108 in an in-vehicle communication network controller) may receive a set of messages provided by one or more network nodes 102 included in an in-vehicle communication network. In some implementations, the controller may determine a security pattern associated with generating a tunnel frame including the set of messages, identify one or more messages based on the security pattern, compute a tunnel frame message authentication code (TMAC) based on one or more characteristics of the one or more messages, and generate the tunnel frame including the TMAC and the set of messages. Additionally, or alternatively, the controller may identify one or more message freshness values included in a corresponding one or more of the messages, determine a tunnel frame freshness value based on one or more message freshness values, and generate a tunnel frame including the tunnel frame freshness value and the set of messages. Additionally, or alternatively, the controller may separately encrypt a set of headers associated with the set of messages, and generate a tunnel frame including the set of encrypted headers and the set of messages.

In some implementations, the techniques and apparatuses for secure tunneling of a frame in an in-vehicle communication network described herein can be utilized to facilitate secure communication between network nodes of an in-vehicle communication network including one or more bus-based communication systems. Additional details are provided below:

FIGS. 2A-2C are diagrams illustrating an example 200 associated with secure tunneling of a frame in an in-vehicle communication network including one or more bus-based communication systems 100. As shown in FIG. 2A, the example 200 comprises communication between one or more network nodes 102 included in a bus-based communication system 100*a*, a controller 108*a*, a controller 108*b*, and one or more network nodes 102*a* included in a bus-based communication system 100*b*. In the example shown in FIG. 2A, the bus-based communication system 100*a* is connected to the bus-based communication system 100*b* via the controller 108*a* and the controller 108*b*. In one example, the bus-based communication system 100*a* may be a first CAN network, the bus-based communication system 100*b* may be a second CAN network, and the controllers 108 may be routing engines, connected to an Ethernet network, that enable communication between channels of the first CAN network and the second CAN network (e.g., such that CAN frames are tunneled over the Ethernet network). In some implementations, one or more network nodes 102 of the bus-based communication system 100*a* and/or the bus-based communication system 100*b* may be included in one or more SZs 110, each comprising one or more SCs 112.

As shown at reference 250, the controller 108*a* may receive a set of messages provided by one or more network nodes 102 included in the in-vehicle communication network. In some implementations, the set of messages may include one or more secure messages (e.g., one or more authenticated-only (i.e., authenticated but not encrypted) messages, one or more authenticated and encrypted messages, or the like). In some implementations, the set of messages may include one or more non-secure messages (e.g., one or more messages that are not authenticated or encrypted). In some implementations, the set of messages may be received from one or more network nodes 102. For example, with reference to example 200, the set of messages may include one or more messages received from one or more network nodes 102 included in the bus-based communication system 100*a*. In some implementations, the set of messages may include a sequence of messages (e.g., a sequence of frames).

As shown at reference 252, the controller 108*a* may determine a security pattern associated with generating a tunnel frame including the set of messages. A security pattern is a pattern that identifies one or more messages from the set of messages the characteristics of which are to be used in association with computing a TMAC, as described herein.

In some implementations, the security pattern may include a sequence of bits, where each bit, in the sequence of bits, maps to a message in the set of messages. Here, a value of a given bit indicates whether a characteristic of a corresponding message is to be used in association with generating a TMAC to be included in a tunnel frame comprising the set of messages. As an illustrative example, the security pattern may include a sequence of six-bit values [1 0 1 1 0 1]. Here, a value of 1 indicates that a characteristic of a corresponding message is to be used in association with generating a TMAC, while a value of 0) indicates that a characteristic of a corresponding message is not to be used in association with generating the TMAC. In this example, for a set of six messages, the security pattern indicates that a characteristic of a first message, a characteristic of a third message, a characteristic of a fourth message, and a characteristic of a sixth message are to be used in association with generating the TMAC (e.g., since each of these messages maps to a value of 1 in the security pattern). Conversely, the security pattern indicates that a characteristic of a second message and a characteristic of a fifth message are not to be used in association with generating the TMAC (e.g., since each of these messages maps to a value of 0 in the security pattern).

In some implementations, the security pattern is a fixed security pattern that is configured on the controller 108a. For example, the controller 108a may be configured with a single security pattern based at least in part on which to identify messages associated with generating TMACs.

Alternatively, the security pattern may be one of plurality of security patterns configured on the controller 108a, where each security pattern is associated with a respective security pattern identifier. For example, the controller 108a may be configured with a table that associates each of a plurality of security patterns with a respective security pattern identifier. In such an implementation, when determining the security pattern, the controller 108a may select the security pattern from the plurality of security patterns. For example, the controller 108a may select a security pattern at random from the table including the plurality of security patterns.

As shown at reference 254, the controller 108a may identify one or more messages from the set of messages based on the security pattern. For example, with reference to the example security pattern described above, the controller 108a may identify the first message, the third message, the fourth message, and the sixth message based at least in part on the security pattern.

As shown at reference 256, the controller 108a may compute a TMAC based on one or more characteristics of the one or more messages. A TMAC is an item of information that can be used to provide authentication of a tunnel frame.

In some implementations, the one or more characteristics based on which the TMAC is computed may include a freshness value associated with a secure message included in the one or more identified messages. Additionally, or alternatively, the one or more characteristics based on which the TMAC is computed may include a network identifier (e.g., a CAN identifier) associated with a message included in the one or more identified messages. Additionally, or alternatively, the set of characteristics based on which the TMAC is computed may include one or more timestamps associated with the one or more identified messages.

In some implementations, the controller 108a may compute the TMAC based at least in part on an algorithm that receives information associated with the one or more characteristics of the one or more messages as input, and provides the TMAC as output. For example, the controller 108a may be configured with an algorithm that receives, as input, one or more freshness values corresponding to the one or more messages identified based on the security pattern, and provides a TMAC as output, with the algorithm being configured to compute the TMAC based on the one or more freshness values.

In some implementations, the use of the TMAC improves security of the tunnel frame. For example, the one or more security patterns being configured on the controllers 108 enables message authentication using the TMAC. Further, the improved tunnel frame security is provided without a significant increase in overhead. Notably, even if an attacker obtains access to the security pattern used in association with generating the TMAC, the attacker still needs to have sufficient processing power to carry out an attack faster than the controller 108a generates and processes the tunnel frame, meaning that an attack may be difficult or impossible even in the case of a security pattern being obtained by the attacker. Additionally, the security pattern used in association with generating the TMAC can be updated (e.g., in the case of a single pattern being configured) or randomly selected (e.g., in the case of multiple configured patterns), thereby increasing tunnel frame security.

As shown at reference 258, the controller 108a may generate the tunnel frame, with the tunnel frame including the TMAC and the set of messages. That is, the controller 108a may generate the tunnel frame such that the tunnel frame includes the TMAC and the set of messages. In some implementations, the controller 108a generates the tunnel frame by encapsulating the set of messages in a frame payload, and prepending a header to the encapsulated set of messages, with the header including the tunnel frame freshness value. Thus, in some implementations, the controller 108a may generate the tunnel frame such that the TMAC is included in a header of the tunnel frame. FIG. 2B is an example illustrating a tunnel frame comprising a header that includes a TMAC in addition to a payload comprising a set of messages M0 through Mn.

In some implementations, the controller 108a may generate the tunnel frame such that the tunnel frame includes a security pattern identifier associated with the security pattern based on which the TMAC was computed. For example, if the controller 108a is configured to (randomly) select a security pattern from a plurality of security patterns configured on the controller 108a, then the controller 108a may include a security pattern identifier corresponding to the selected security pattern in the tunnel frame (e.g., so as to enable another controller 108a to identify the security pattern based on which the TMAC was computed). FIG. 2C is an example illustrating a tunnel frame comprising a header that includes a TMAC and a security pattern identifier (PID) in addition to a payload comprising a set of messages M0 through Mn.

In some implementations, the controller 108a may generate the tunnel frame to further include a tunnel frame freshness value. For example, the controller 108a may in some implementations determine a tunnel frame freshness value based on one or more message freshness values and may generate the tunnel frame so as to include the tunnel frame freshness values, as described in more detail with respect to FIG. 3.

In some implementations, the controller 108a may generate the tunnel frame to further include a set of separately encrypted headers. For example, the controller 108a may (separately) encrypt each set in a set of headers associated with the set of messages and may generate the tunnel frame so as to include the set of encrypted headers, as described in more detail with respect to FIG. 4.

Returning to FIG. 2A, as shown at reference 260, the controller 108a may provide the tunnel frame. For example, the controller 108a may provide the tunnel frame, including the TMAC and the set of messages, for reception by the controller 108b (e.g., so that the controller 108b can authenticate the tunnel frame, perform de-encapsulation, and provide the set of messages to one or more network nodes 102 included in the bus-based communication system 100b)

In some implementations, the controller 108b may perform authentication for the tunnel frame. For example, the controller 108b may be configured with the same security pattern used by the controller 108a in association with generating the TMAC. Here, the controller 108b may determine the security pattern (e.g., based on the security pattern identifier included in the tunnel frame, in a scenario when the controller 108b is configured with a plurality of security patterns). The controller 108b may then identify the one or more messages based on the security pattern, compute a TMAC based at least in part on one or more characteristics of the one or more messages, and compare the computed TMAC to the TMAC received in the tunnel frame. Here, if the computed TMAC matches the received TMAC, then the controller 108b may authenticate the tunnel frame. Conversely, if the computed TMAC does not match the received TMAC, then the controller 108b may determine that the tunnel frame is not authentic and may proceed accordingly (e.g., by dropping the tunnel frame).

In some implementations, if the controller 108b authenticates the tunnel frame, then the controller 108b may perform de-encapsulation and forward the set of messages to one or more network nodes 102 included in the bus-based communication system 100b for which the set of messages is intended.

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

Figure 3:
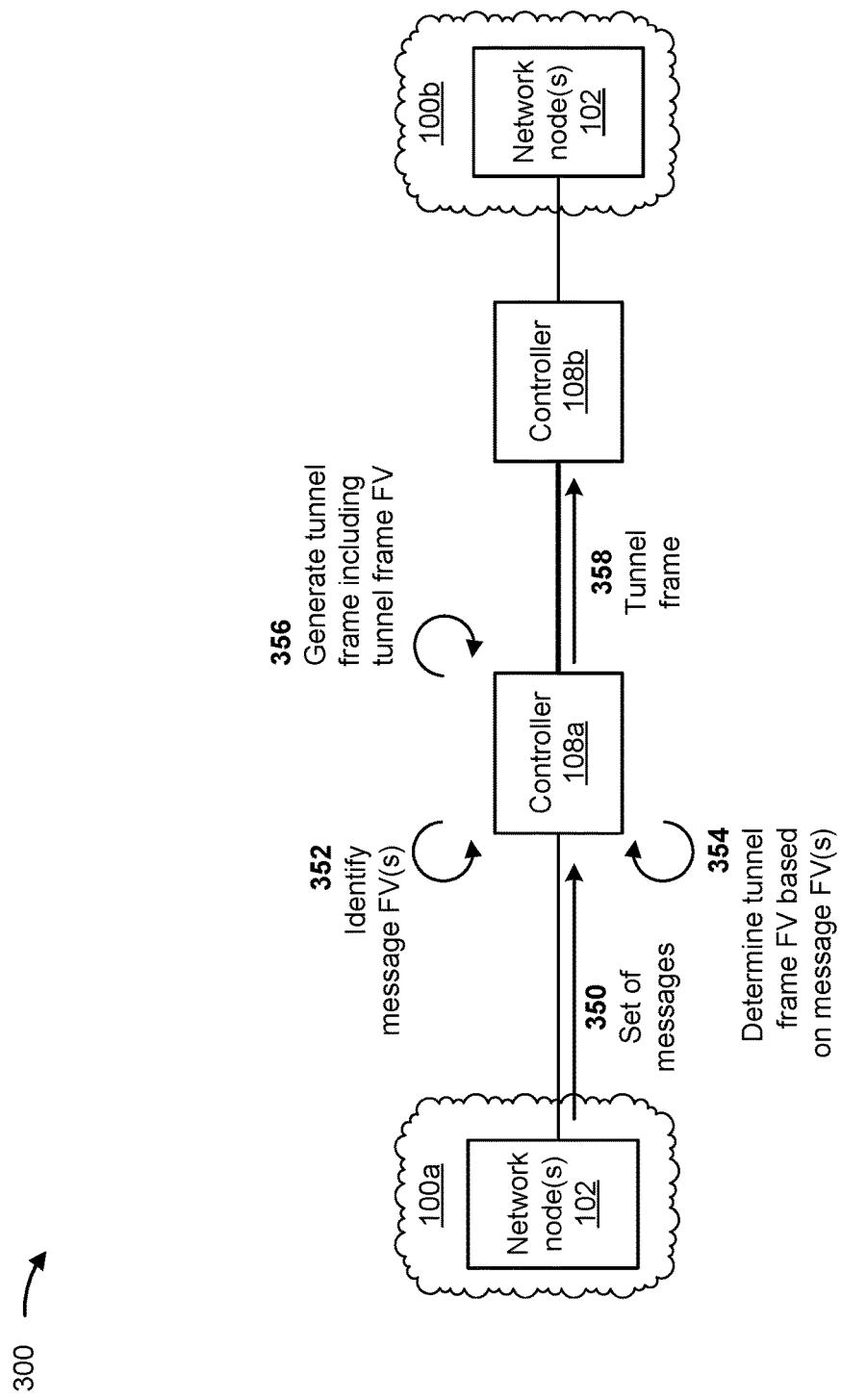
FIG. 3 is a diagram illustrating another example associated with secure tunneling of a frame in an in-vehicle communication network.

FIG. 3 is a diagram illustrating an example 300 associated with secure tunneling of a frame in an in-vehicle communication network including one or more bus-based communication systems 100. As shown in FIG. 3, the example 300 comprises communication between one or more network nodes 102 included in a bus-based communication system 100a, a controller 108a, a controller 108b, and one or more network nodes 102a included in a bus-based communication system 100b. In the example shown in FIG. 3, the bus-based communication system 100a is connected to the bus-based communication system 100b via the controller 108a and the controller 108b. In one example, the bus-based communication system 100a may be a first CAN network, the bus-based communication system 100b may be a second CAN network, and the controllers 108 may be routing engines, connected to an Ethernet network, that enable communication between channels of the first CAN network and the second CAN network (e.g., such that CAN frames are tunneled over the Ethernet network). In some implementations, one or more network nodes 102 of the bus-based communication system 100a and/or the bus-based communication system 100b may be included in one or more SZs 110, each comprising one or more SCs 112.

As shown at reference 350, the controller 108a may receive a set of messages provided by one or more network nodes 102 included in the in-vehicle communication network. In some implementations, the set of messages may include one or more secure messages (e.g., one or more authenticated-only messages, one or more authenticated and encrypted messages, or the like). In some implementations, the set of messages may include one or more non-secure messages (e.g., one or more messages that are not authenticated or encrypted). In some implementations, the set of messages may be received from one or more network nodes 102. For example, with reference to example 300, the set of messages may include one or more messages received from one or more network nodes 102 included in the bus-based communication system 100a. In some implementations, the set of messages may include a sequence of messages (e.g., a sequence of frames).

As shown at reference 352, the controller 108a may identify one or more message freshness values (FVs) associated with determining a tunnel frame freshness value, where the one or more message freshness values are included in a corresponding one or more messages of the set of messages. A freshness value is a value, such as a message counter value or a timestamp value, that is used to ensure freshness of a message (e.g., to prevent a replay attack). In some implementations, each message in the set of messages includes a respective freshness value. In some implementations, the controller 108a may use the one or more message freshness values in association with determining a tunnel frame freshness value, as described below with respect to reference 354. A tunnel frame freshness value is a freshness value to be included in the tunnel frame generated by the controller 108a (e.g., so that freshness of the tunnel frame can be verified by the controller 108b). Notably, the tunnel frame freshness value is a freshness value associated with the tunnel frame itself (as compared to a freshness value associated with a particular message).

In some implementations, the one or more message freshness values based on which the tunnel frame freshness value is to be determined may include a single message freshness value associated with a single message in the set of messages. Alternatively, the one or more message freshness values based on which the tunnel frame freshness value is to be determined may include a plurality of message freshness values associated with a corresponding plurality of messages in the set of messages.

In some implementations, the one or more message freshness values are identified based on a timing of the tunnel frame. That is, the controller 108a may in some implementations identify the one or more message freshness values to be used for determining the tunnel frame freshness value based on a timing of the tunnel frame. For example, at a time t0 associated with a first tunnel frame (e.g., a timestamp at which the controller 108a is indicated to generate the first tunnel frame), the controller 108a may identify a freshness value included in a first message M0 in a sequence of messages as the message freshness value based on which the tunnel frame freshness value is to be determined. Continuing this example, at a time t1 (e.g., a time later than t0) associated with a second tunnel frame (e.g., a timestamp at which the controller 108a is indicated to generate the second tunnel frame), the controller 108a may identify a freshness value included in a second message M1 in a sequence of messages as the message freshness value based on which the tunnel frame freshness value is to be determined. In this way, the message freshness value based on which the tunnel frame freshness value is to be determined can vary with respect to time, thereby improving tunnel frame security (e.g., since the one or more message freshness values used to determine the tunnel frame freshness value can vary with respect to time).

As shown at reference 354, the controller 108a may determine the tunnel frame freshness value based on one or more message freshness values.

In some implementations, the controller 108a may determine the tunnel frame freshness value to be a single message freshness value. That is, in some implementations, the one or more message freshness values may include a single message freshness value and the controller 108a determines the tunnel frame freshness value as the single message freshness value (i.e., the controller 108a uses the message freshness value as the tunnel frame freshness value).

In some implementations, the controller 108a determines the tunnel frame freshness value by applying a tunnel frame freshness value function to the one or more message freshness values. That is, the controller 108a may in some implementations apply the tunnel frame freshness value function to the one or more message freshness values, and a result of applying the tunnel frame freshness value function to the one or more message freshness values is the tunnel frame freshness value. Such a function can be represented as:

$$FV_T = g(FV_1, FV_2 \ldots FV_n)$$

where $FV_T$ represents the tunnel frame freshness value, g is the tunnel frame freshness value function, $FV_1$ is a message freshness value associated with a first message in the set of messages, and $FV_n$ ($n \geq 1$) is a message freshness value associated with an nth message in the set of messages.

As one example, the tunnel frame freshness value function may be a hash function. That is, the controller 108a may in some implementations be configured to apply a hash function to at least one message freshness value to generate a hashed message freshness value, where a result of applying the hash function to the at least one message freshness value is the tunnel frame freshness value. Applying the hash function (or another function) to the at least one message freshness value serves to obfuscate the ordering of selection of the one or more message freshness values from among those included in the set of messages, thereby increasing tunnel frame security (e.g., so an attacker is unable to determine the ordering of selection of message freshness values).

As shown at reference 356, the controller 108a may generate a tunnel frame, with the tunnel frame including the tunnel frame freshness value and the set of messages. That is, the controller 108a may generate the tunnel frame such that the tunnel frame includes the tunnel frame freshness value and the set of messages. In some implementations, the controller 108a generates the tunnel frame by encapsulating the set of messages in a frame payload, and prepending a header to the encapsulated set of messages, with the header including the tunnel frame freshness value.

In some implementations, the controller 108a may generate the tunnel frame to further include a TMAC. For example, the controller 108a may in some implementations compute a TMAC based on one or more characteristics of one or more messages and may generate the tunnel so as to include the TMAC, as described in more detail with respect to FIGS. 2A-2C.

In some implementations, the controller 108a may generate the tunnel frame to further include a set of separately encrypted headers. For example, the controller 108a may (separately) encrypt each set in a set of headers associated with the set of messages and may generate the tunnel frame so as to include the set of encrypted headers, as described in more detail with respect to FIG. 4.

As shown at reference 358, the controller 108a may provide the tunnel frame. For example, the controller 108a may provide the tunnel frame, including the tunnel frame freshness value and the set of messages, for reception by the controller 108b (e.g., so that the controller 108b can verify freshness of the tunnel frame, perform de-encapsulation, and provide the set of messages to one or more network nodes 102 included in the bus-based communication system 100b).

In some implementations, the controller 108b may verify freshness for the tunnel frame. For example, the controller 108b may be configured to determine a tunnel frame freshness value in the same manner used by the controller 108a in association with determining the tunnel frame freshness value (e.g., using the same particular message freshness value, using the same tunnel frame freshness value function, or the like). Here, the controller 108b may determine the tunnel frame freshness value and compare the determined tunnel frame freshness value to the tunnel frame freshness value received in the tunnel frame. If the determined tunnel frame freshness value matches the received tunnel frame freshness value, then the controller 108b may authenticate the tunnel frame. Conversely, if the determined tunnel frame freshness value does not match the received tunnel frame freshness value, then the controller 108b may determine that the tunnel frame is not authentic and may proceed accordingly (e.g., by dropping the tunnel frame).

In some implementations, if the controller 108b authenticates the tunnel frame, then the controller 108b may perform de-encapsulation and forward the set of messages to one or more network nodes 102 included in the bus-based communication system 100b for which the set of messages is intended.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
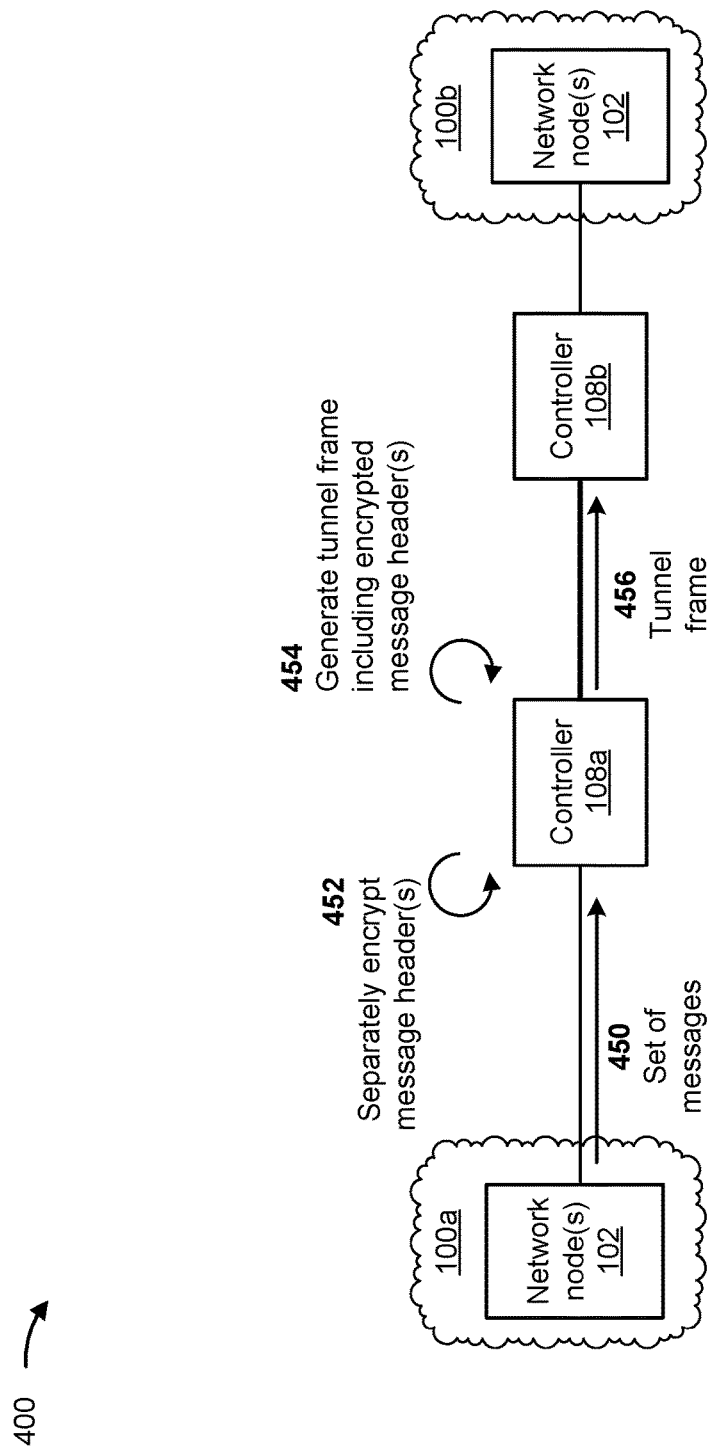
FIG. 4 is a diagram illustrating another example associated with secure tunneling of a frame in an in-vehicle communication network.

FIG. 4 is a diagram illustrating an example 400 associated with secure tunneling of a frame in an in-vehicle communication network including one or more bus-based communication systems 100. As shown in FIG. 4, the example 400 comprises communication between one or more network nodes 102 included in a bus-based communication system 100a, a controller 108a, a controller 108b, and one or more network nodes 102a included in a bus-based communication system 100b. In the example shown in FIG. 4, the bus-based communication system 100a is connected to the bus-based communication system 100b via the controller 108a and the controller 108b. In one example, the bus-based communication system 100a may be a first CAN network, the bus-based communication system 100b may be a second CAN network, and the controllers 108 may include routing engines, connected to an Ethernet network, that enable communication between channels of the first CAN network and the second CAN network (e.g., such that CAN frames are tunneled over the Ethernet network). In some implementations, one or more network nodes 102 of the bus-based communication system 100a and/or the bus-based communication system 100b may be included in one or more SZs 110, each comprising one or more SCs 112. In another example, alternative to including routing engines, the controllers 108 may utilize a software-based approach according to which software configured on the controllers 108 perform operations of routing engines.

As shown at reference 450), the controller 108a may receive a set of messages provided by one or more network nodes 102 included in the in-vehicle communication network. In some implementations, the set of messages may include one or more secure messages (e.g., one or more authenticated-only messages, one or more authenticated and encrypted messages, or the like). In some implementations, the set of messages may include one or more non-secure messages (e.g., one or more messages that are not authenticated or encrypted). In some implementations, the set of messages may be received from one or more network nodes 102. For example, with reference to example 400, the set of messages may include one or more messages received from one or more network nodes 102 included in the bus-based communication system 100a. In some implementations, the set of messages may include a sequence of messages (e.g., a sequence of frames).

As shown at reference 452, the controller 108a may encrypt a set of headers associated with the set of messages to generate a set of encrypted headers associated with the set of messages. In some implementations, each header in the set of headers is encrypted separately from other headers in the set of headers. That is, the controller 108a may encrypt each header in the set of headers independently from encrypting other headers in the set of headers.

In some implementations, encryption of the set of headers improves security of the tunnel frame. For example, conventionally, headers in messages are unencrypted (e.g., as compared to message payloads, which may be encrypted). Thus, an attacker connected to the in-vehicle communication network may be capable of obtaining information from unencrypted headers, thereby compromising security. Therefore, in some implementations, the controller 108a may encrypt the set of headers corresponding to the set of messages. Notably, a full encryption of the tunnel frame payload (including n+1 messages, each comprising a header and a payload) is possible, but is inefficient and increases resource consumption (e.g., processing power, battery power, or the like). Therefore, as indicated above, the controller 108a may in some implementations separately encrypt each header in the set of headers. In some implementations, separate encryption reduces resource consumption (e.g., as compared to full encryption of the tunnel frame).

In some implementations, the controller 108a generates the set of encrypted headers by applying a header encryption function to each header in the set of headers. That is, the controller 108a may in some implementations apply the header encryption function to each header in the set of headers separately, and a result of applying the header encryption function to each header in the set of headers is the encrypted set of headers. Such a function can be represented as:

$$C_i = f(H_i)$$

where $C_i$ is an encrypted header associated with an ith message, $f$ is the header encryption function, and $H_i$ is the header for the ith message.

In some implementations, the controller 108a may encrypt a header in the set of headers based on a lookup table that maps information included in the header to an encrypted header. For example, a subset of information included in the header may be mapped to an encrypted header. Such an implementation may serve to, for example, reduce resource consumption associated with encrypting a given header (e.g., since use of the lookup table would consume a comparatively lesser amount of resources than performing an encryption).

In some implementations, the controller 108a may encrypt a header in the set of headers based on a pre-defined header key associated with the header. That is, in some implementations, the controller 108a may be configured with a set of security keys, each of which is associated with a header in the set of headers. Here, the controller 108a may encrypt each header in the set of headers using a corresponding header security key.

In some implementations, the controller 108a may employ parallel processing in association with encrypting the set of headers. That is, in some implementations, the controller 108a encrypts at least one header in the set of headers in parallel with encrypting at least one other header in the set of headers. In some implementations, the use of parallel processing reduces delay associated with generating the tunnel frame including the set of encrypted headers, thereby reducing latency associated with transmitting the tunnel frame including the set of messages.

As shown at reference 454, the controller 108a may generate a tunnel frame, with the tunnel frame including the set of encrypted headers and the set of messages. That is, the controller 108a may generate the tunnel frame such that the tunnel frame includes the set of encrypted headers and the set of messages. In some implementations, the controller 108a generates the tunnel frame by encapsulating the set of messages and the set of encrypted headers in a frame payload, and prepending a tunnel frame header to the encapsulated set of messages.

In some implementations, the controller 108a may generate the tunnel frame to further include a TMAC. For example, the controller 108a may in some implementations compute a TMAC based on one or more characteristics of one or more messages and may generate the tunnel so as to include the TMAC, as described in more detail with respect to FIGS. 2A-2C.

In some implementations, the controller 108a may generate the tunnel frame to further include a tunnel frame freshness value. For example, the controller 108a may in some implementations determine a tunnel frame freshness value based on one or more message freshness values and may generate the tunnel frame so as to include the tunnel frame freshness values, as described in more detail with respect to FIG. 3.

As shown at reference 456, the controller 108a may provide the tunnel frame. For example, the controller 108a may provide the tunnel frame, including the set of encrypted headers and the set of messages, for reception by the controller 108b (e.g., so that the controller 108b can perform de-encapsulation, decrypt the set of headers, and provide the set of messages to one or more network nodes 102 included in the bus-based communication system 100b).

In some implementations, the controller 108b may decrypt the set of encrypted headers. For example, the controller 108b may be configured with information similar to that with which the controller 108a is configured (e.g., the same header encryption function, the same lookup table, the same header security keys, or the like). Thus, the controller 108b may decrypt the set of encrypted headers so as to revert to the set of headers (e.g., as initially received by the controller 108a). In this way, header security and, therefore, tunnel frame security can be improved.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

Figure 5:
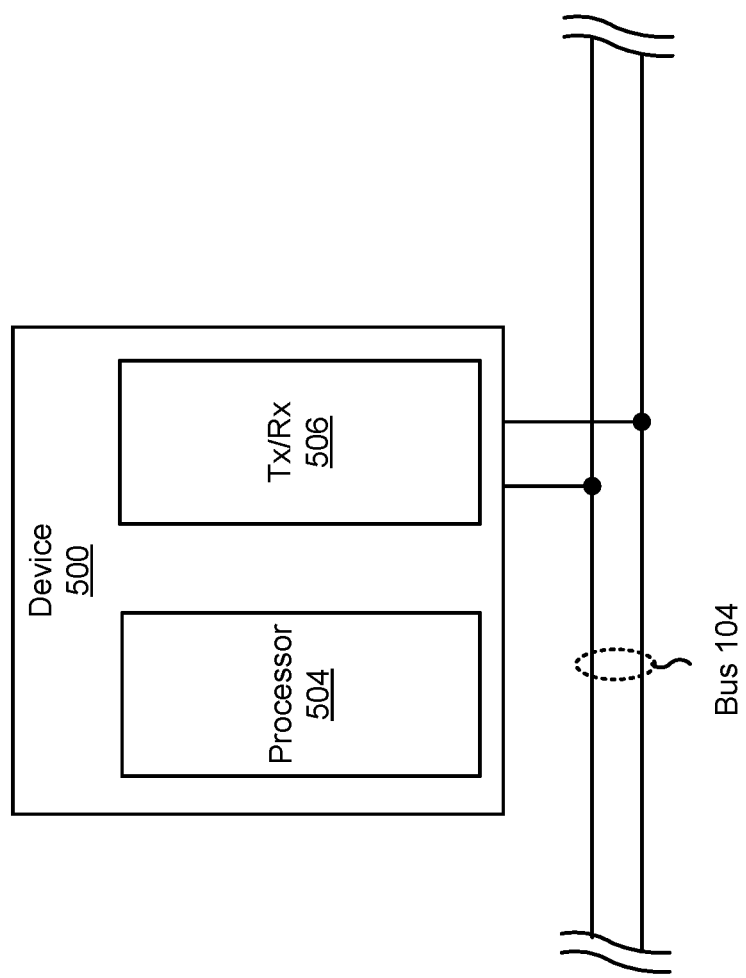
FIGS. 5 and 6 are diagrams of example components of devices associated with secure tunneling of a frame in an in-vehicle communication network.

FIG. 5 is a diagram of an example of a device 500 associated with secure tunneling of a frame in an in-vehicle communication network. In some implementations, the device 500 may correspond to a network node 102. As shown in FIG. 5, the device 500 may include a processor 504 and a transceiver (e.g., Tx/Rx) 506 connected to a communication bus 104 (e.g., a CAN bus).

The device 500 may include one or more devices associated with controlling one or more other devices and/or one or more electrical systems and/or electrical subsystems based, for example, on sensor data provided by sensors connected to the device 500 via a sensor interface component of the device 500 (not shown), control data for controlling actuators connected to the device 500 via an actuator interface component of node (not shown), and/or the like. In a vehicle system, for example, the device 500 may include an ECU, an ECM, a PCM, a TCM, a BCM, a CCM, a CTM, a GEM, a BCM, an SCM, or another type of electrical system or electrical subsystem of a vehicle.

Processor 504 includes a device (e.g., one or more integrated circuits) that operates as an embedded system for providing the control functionality associated with the device 500. For example, processor 504 includes one or more central processing units (CPUs), memories, and/or programmable input/output (I/O) peripherals that allow processor 504 to operate as an embedded system. In some examples, processor 504 may send information to and/or receive information from transceiver 506.

Transceiver 506 includes a component via which the device 500 may transmit and receive information. For example, transceiver 506 may include a differential line transceiver, or a similar type of component. In some examples, transceiver 506 includes a transmit (Tx) component that allows the device 500 to transmit information (e.g., to another node) via communication bus 104, and/or a receive (Rx) component that allows the device 500 to receive information (e.g., from another node that is similar to the device 500) via communication bus 104. In some examples, transceiver 506 may include a line driver for enabling the Tx component (to transmit information) or the Rx component (to receive information) at a given time. In some examples, transceiver 506 may be a CAN transceiver, a LIN transceiver, a FlexRay transceiver, an Ethernet transceiver, or another type of transceiver associated with another type of bus system. In some examples, the device 500 may include multiple transceivers 506 of different types.

Communication bus 104 includes a bus for carrying information from or to the device 500. In some examples, communication bus 104 may comprise a connection (e.g., including one or more terminals, wires, and/or connectors) via which multiple network nodes 102 are connected to one another. In some examples, communication bus 104 may include a set of connections, each associated with one or more network nodes 102. In some examples, communication bus 104 may be a CAN bus, a CAN FD bus, a CAN XL bus, a LIN bus, a FlexRay bus, an Ethernet bus, and/or another type of bus. In some examples, each transceiver 506 of the device 500 may be connected to an associated communication bus 104.

The number and arrangement of devices and components shown in FIG. 5 are provided as an example. In practice, there may be additional devices and/or components, fewer devices and/or components, different devices and/or components, or differently arranged devices and/or components than those shown in FIG. 5. Furthermore, two or more devices and/or components shown in FIG. 5 may be implemented within a single device and/or component, or a single device and/or a single component shown in FIG. 5 may be implemented as multiple, distributed devices and/or components. Additionally, or alternatively, a set of devices and/or components (e.g., one or more devices and/or components) of FIG. 5 may perform one or more functions described as being performed by another set of devices and/or components of FIG. 5.

Figure 6:
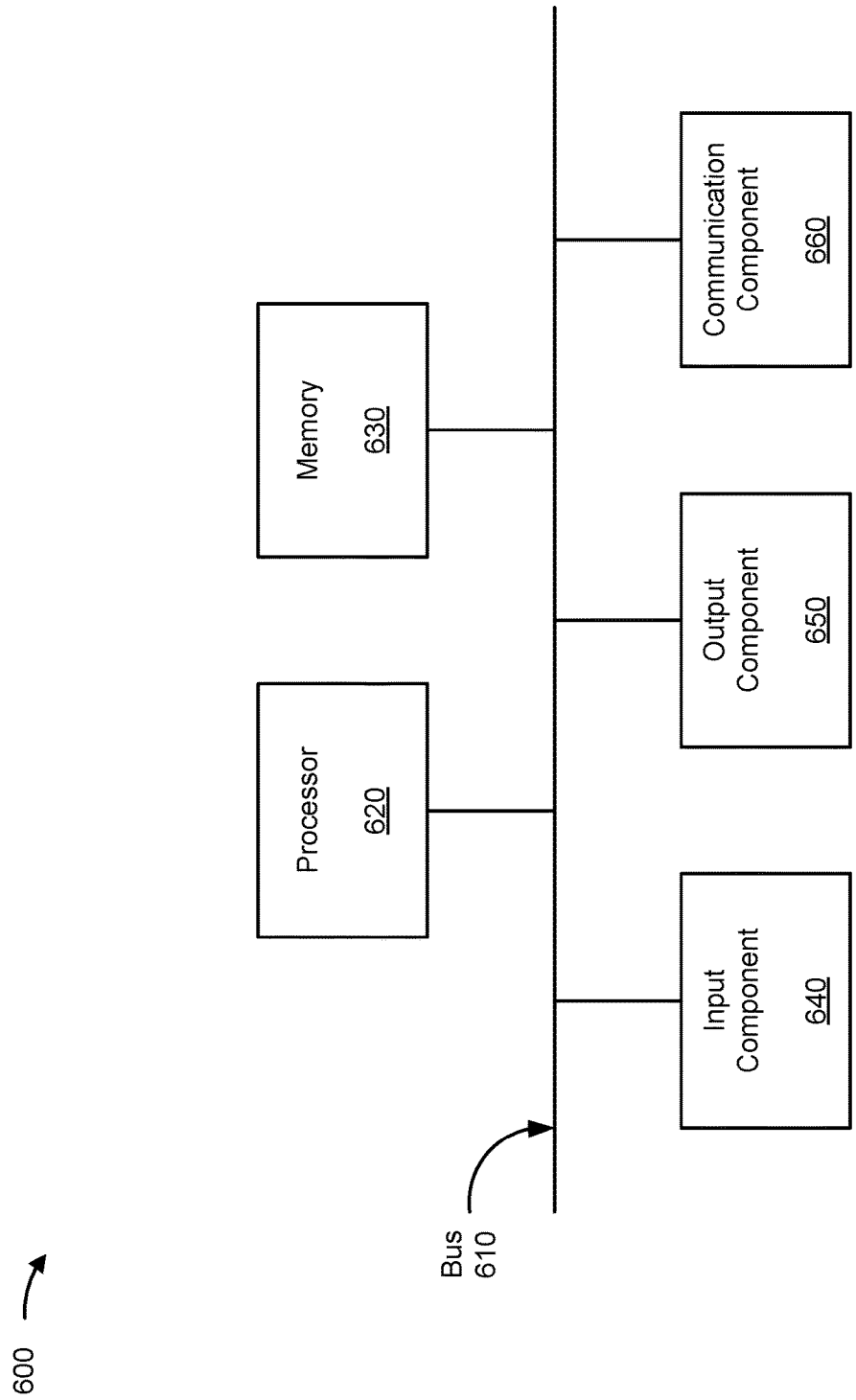

FIG. 6 is a diagram of example components of a device 600 associated with secure tunneling of a frame in an in-vehicle communication network. The device 600 may correspond to controller 108. In some implementations, the controller 108 may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600.

In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a key board, a keypad, a mouse, a button, a microphone, a switch, a sensor, a global positioning system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
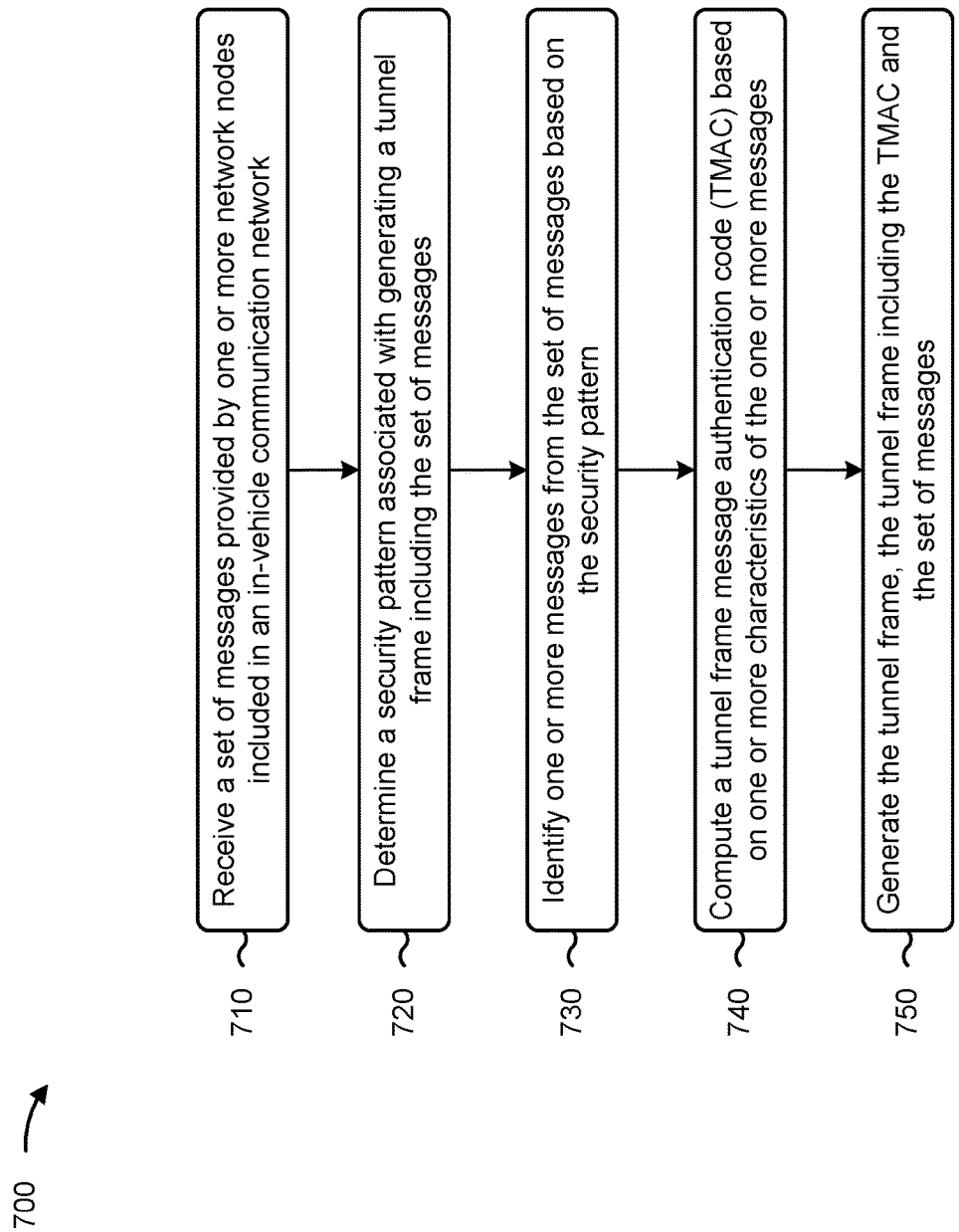
FIGS. 7-9 are flowcharts of example processes associated with secure tunneling of a frame in an in-vehicle communication network.

FIG. 7 is a flowchart of an example process 700 associated with secure tunneling of a frame in an in-vehicle communication network. In some implementations, one or more process blocks of FIG. 7 are performed by a controller (e.g., controller 108). In some implementations, one or more process blocks of FIG. 7 are performed by another device or a group of devices separate from or including the controller, such as a network node (e.g., a network node 102). Additionally, or alternatively, one or more process blocks of FIG. 7 may be performed by one or more components of the controller, such as by one or more components of a device 600 as shown in FIG. 6.

As shown in FIG. 7, process 700 may include receiving a set of messages provided by one or more network nodes included in an in-vehicle communication network (block 710). For example, the controller may receive a set of messages provided by one or more network nodes included in an in-vehicle communication network, as described above.

As further shown in FIG. 7, process 700 may include determining a security pattern associated with generating a tunnel frame including the set of messages (block 720). For example, the controller may determine a security pattern associated with generating a tunnel frame including the set of messages, as described above.

As further shown in FIG. 7, process 700 may include identifying one or more messages from the set of messages based on the security pattern (block 730). For example, the controller may identify one or more messages from the set of messages based on the security pattern, as described above.

As further shown in FIG. 7, process 700 may include computing a TMAC based on one or more characteristics of the one or more messages (block 740). For example, the controller may compute a TMAC based on one or more characteristics of the one or more messages, as described above.

As further shown in FIG. 7, process 700 may include generating the tunnel frame, the tunnel frame including the TMAC and the set of messages (block 750). For example, the controller may generate the tunnel frame, the tunnel frame including the TMAC and the set of messages, as described above.

Process 700 may include additional implementations, such as any single implementation or any combination of implementations described below and/or in connection with one or more other processes described elsewhere herein.

In a first implementation, the one or more characteristics include at least one freshness value associated with at least one secure message included in the one or more messages.

In a second implementation, alone or in combination with the first implementation, the set of characteristics includes one or more timestamps associated with the one or more messages.

In a third implementation, alone or in combination with one or more of the first and second implementations, the security pattern is a fixed security pattern that is configured on the controller.

In a fourth implementation, alone or in combination with one or more of the first through third implementations, determining the security pattern comprises selecting the security pattern from a plurality of security patterns configured on the controller, wherein each security pattern of the plurality of security patterns is associated with a respective security pattern identifier of a plurality of security pattern identifiers.

In a fifth implementation, alone or in combination with one or more of the first through fourth implementations, the tunnel frame further includes a security pattern identifier corresponding to the security pattern.

In a sixth implementation, alone or in combination with one or more of the first through fifth implementations, process 700 further comprises determining a tunnel frame freshness value based on one or more message freshness values, wherein the generated tunnel frame further includes the tunnel frame freshness value.

In a seventh implementation, alone or in combination with one or more of the first through sixth implementations, process 700 further comprises encrypting a set of headers associated with the set of messages to generate a set of encrypted headers, wherein the generated tunnel frame further includes the set of encrypted headers.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

Figure 8:
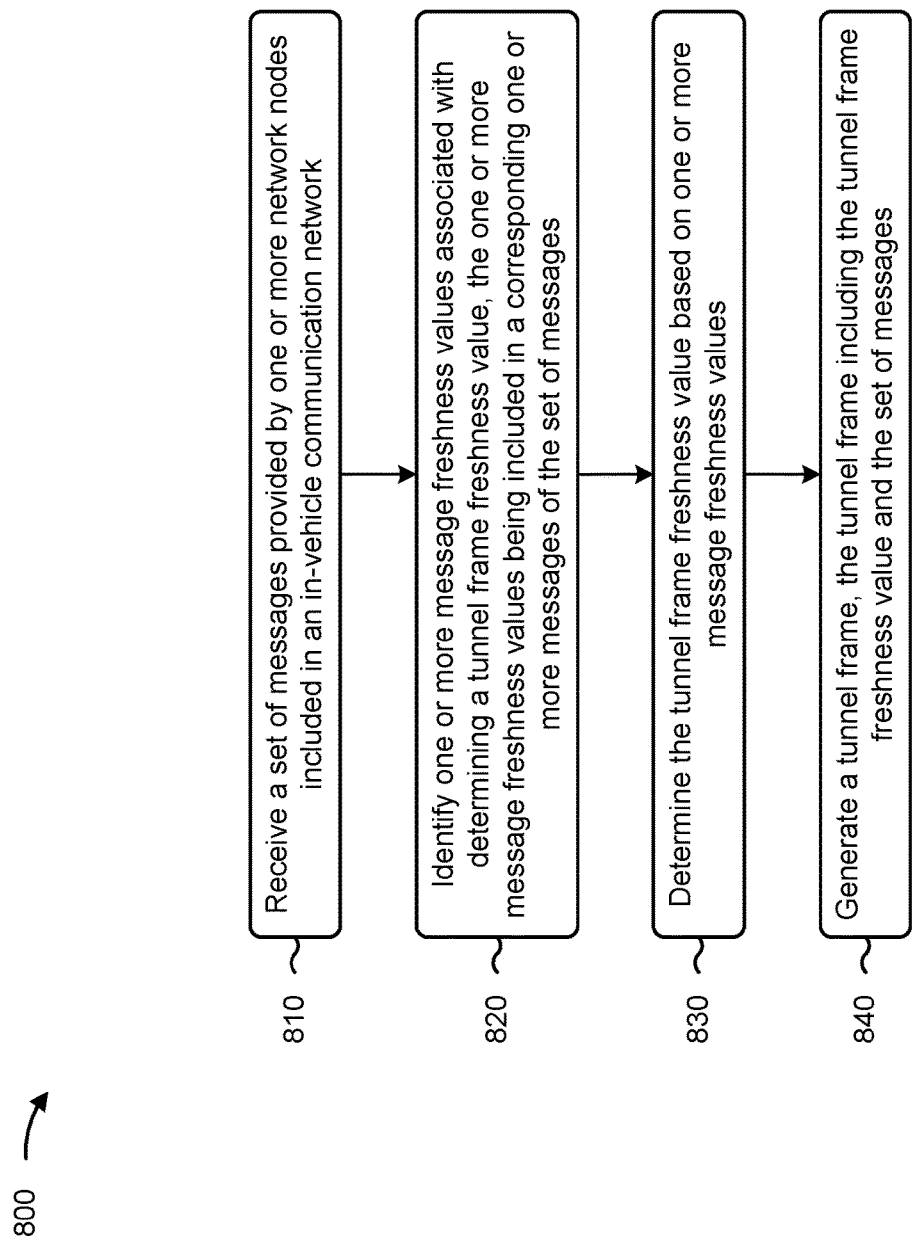

FIG. 8 is a flowchart of an example process 800 associated with secure tunneling of a frame in an in-vehicle communication network. In some implementations, one or more process blocks of FIG. 8 are performed by a controller (e.g., controller 108). In some implementations, one or more process blocks of FIG. 8 are performed by another device or a group of devices separate from or including the controller, such as a network node (e.g., a network node 102). Additionally, or alternatively, one or more process blocks of FIG. 8 may be performed by one or more components of the controller, such as by one or more components of a device 600 as shown in FIG. 6.

As shown in FIG. 8, process 800 may include receiving a set of messages provided by one or more network nodes included in an in-vehicle communication network (block 810). For example, the controller may receive a set of messages provided by one or more network nodes included in an in-vehicle communication network, as described above.

As further shown in FIG. 8, process 800 may include identifying one or more message freshness values associated with determining a tunnel frame freshness value, the one or more message freshness values being included in a corresponding one or more messages of the set of messages (block 820). For example, the controller may identify one or more message freshness values associated with determining a tunnel frame freshness value, the one or more message freshness values being included in a corresponding one or more messages of the set of messages, as described above.

As further shown in FIG. 8, process 800 may include determining the tunnel frame freshness value based on one or more message freshness values (block 830). For example, the controller may determine the tunnel frame freshness value based on one or more message freshness values, as described above.

As further shown in FIG. 8, process 800 may include generating a tunnel frame, the tunnel frame including the tunnel frame freshness value and the set of messages (block 840). For example, the controller may generate a tunnel frame, the tunnel frame including the tunnel frame freshness value and the set of messages, as described above.

Process 800 may include additional implementations, such as any single implementation or any combination of implementations described below and/or in connection with one or more other processes described elsewhere herein.

In a first implementation, the one or more message freshness values are identified based on a timing of the tunnel frame.

In a second implementation, alone or in combination with the first implementation, the one or more message freshness values comprise a single message freshness value and the tunnel frame freshness value is determined as the single message freshness value.

In a third implementation, alone or in combination with one or more of the first and second implementations, process 800 further comprises applying a tunnel frame freshness value function to the one or more message freshness values, wherein the tunnel frame freshness value is determined based on a result of applying the tunnel frame freshness value function to the one or more message freshness values.

In a fourth implementation, alone or in combination with one or more of the first through third implementations, process 800 further comprises applying a hash function to a message freshness value of the one or more message freshness values to generate a hashed message freshness value, wherein the tunnel frame freshness value is determined based on the hashed message freshness value.

In a fifth implementation, alone or in combination with one or more of the first through fourth implementations, process 800 further comprises computing a TMAC based on one or more characteristics of the one or more messages, wherein the generated tunnel frame further includes the TMAC.

In a sixth implementation, alone or in combination with one or more of the first through fifth implementations, process 800 further comprises encrypting a set of headers associated with the set of messages to generate a set of encrypted headers, wherein the generated tunnel frame further includes the set of encrypted headers.

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

Figure 9:
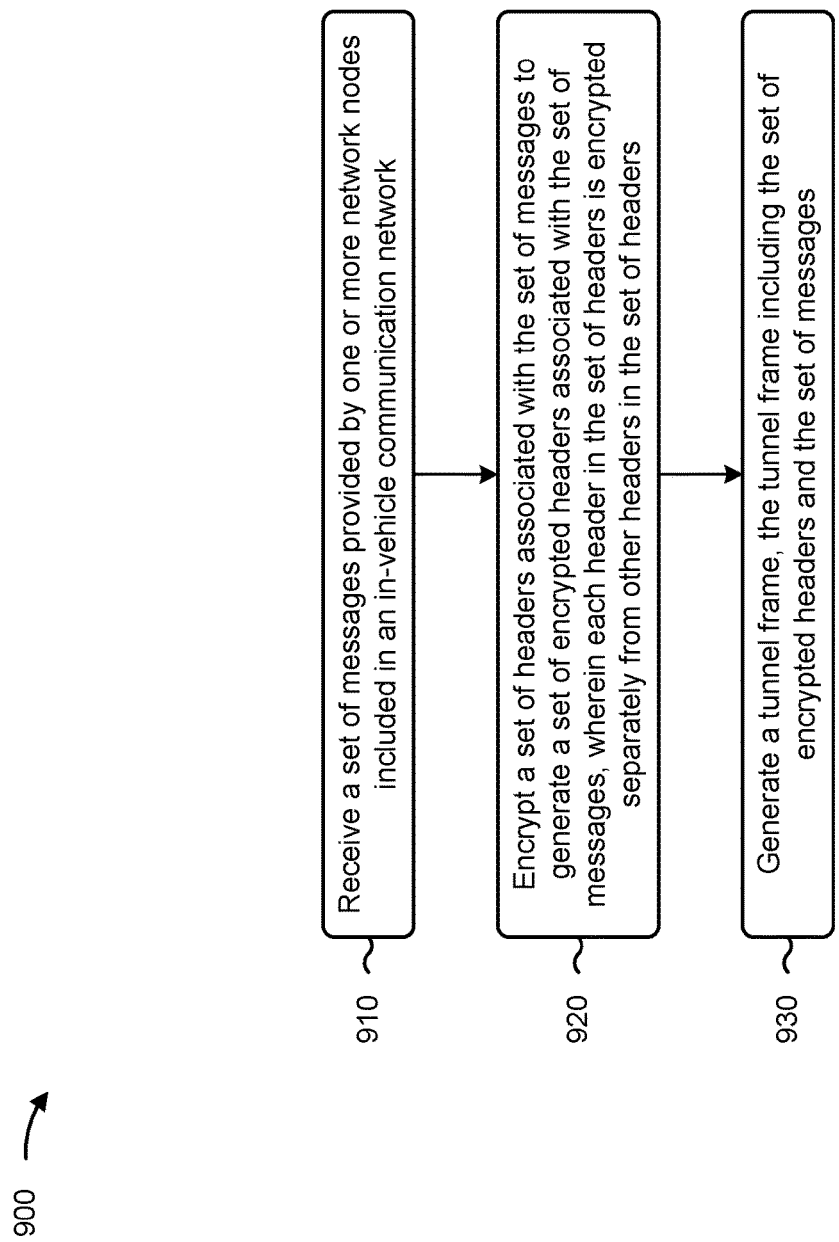

FIG. 9 is a flowchart of an example process 900 associated with secure tunneling of a frame in an in-vehicle communication network. In some implementations, one or more process blocks of FIG. 9 are performed by a controller (e.g., controller 108). In some implementations, one or more process blocks of FIG. 9 are performed by another device or a group of devices separate from or including the controller, such as a network node (e.g., a network node 102). Additionally, or alternatively, one or more process blocks of FIG. 9 may be performed by one or more components of the controller, such as by one or more components of a device 600 as shown in FIG. 6.

As shown in FIG. 9, process 900 may include receiving a set of messages provided by one or more network nodes included in an in-vehicle communication network (block 910). For example, the controller may receive a set of messages provided by one or more network nodes included in an in-vehicle communication network, as described above.

As further shown in FIG. 9, process 900 may include encrypting a set of headers associated with the set of messages to generate a set of encrypted headers associated with the set of messages, each header in the set of headers being encrypted separately from other headers in the set of headers (block 920). For example, the controller may encrypt a set of headers associated with the set of messages to generate a set of encrypted headers associated with the set of messages, each header in the set of headers being encrypted separately from other headers in the set of headers, as described above. In some implementations, each header in the set of headers is encrypted separately from other headers in the set of headers.

As further shown in FIG. 9, process 900 may include generating a tunnel frame, the tunnel frame including the set of encrypted headers and the set of messages (block 930). For example, the controller may generate a tunnel frame, the tunnel frame including the set of encrypted headers and the set of messages, as described above.

Process 900 may include additional implementations, such as any single implementation or any combination of implementations described below and/or in connection with one or more other processes described elsewhere herein.

In a first implementation, process 900 further comprises applying a header encryption function to each header in the set of headers, wherein the set of encrypted headers is generated based on a result of applying the header encryption function to each header in the set of headers.

In a second implementation, alone or in combination with the first implementation, a header in the set of headers is encrypted based on a lookup table that maps information included in the header to an encrypted header.

In a third implementation, alone or in combination with one or more of the first and second implementations, a header in the set of headers is encrypted based on a predefined key associated with the header.

In a fourth implementation, alone or in combination with one or more of the first through third implementations, at least one header in the set of headers is encrypted in parallel with at least one other header in the set of headers.

In a fifth implementation, alone or in combination with one or more of the first through fourth implementations, process 900 further comprises computing a TMAC based on one or more characteristics of the one or more messages, wherein the generated tunnel frame further includes the TMAC.

In a sixth implementation, alone or in combination with one or more of the first through fifth implementations, process 900 further comprises determining a tunnel frame freshness value based on one or more message freshness values, wherein the generated tunnel frame further includes the tunnel frame freshness value.

Although FIG. 9 shows example blocks of process 900, in some implementations, process 900 includes additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An in-vehicle communication network controller, comprising:
   one or more memories;
   one or more processors, coupled to the one or memories, configured to:
      receive a set of messages provided by one or more network nodes included in an in-vehicle communication network;
      determine a security pattern associated with generating a tunnel frame including the set of messages, wherein the security pattern includes a sequence of bits, and wherein each bit, in the sequence of bits, maps to a corresponding message in the set of messages, and wherein each bit, in the sequence of bits, indicates whether or not a characteristic of the corresponding message is to be used in association with computing a tunnel frame message authentication code (TMAC);
      identify, based on the security pattern, one or more messages from the set of messages to be used in association with computing the TMAC;
      compute the TMAC based on one or more characteristics of the one or more messages; and
      generate the tunnel frame, the tunnel frame including the TMAC and the set of messages.

2. The in-vehicle communication network controller of claim 1, wherein the one or more characteristics include at least one freshness value associated with at least one secure message included in the one or more messages.

3. The in-vehicle communication network controller of claim 1, wherein the one or more characteristics includes one or more timestamps associated with the one or more messages.

4. The in-vehicle communication network controller of claim 1, wherein the security pattern is a fixed security pattern that is configured on the in-vehicle communication network controller.

5. The in-vehicle communication network controller of claim 1, wherein the one or more processors, when determining the security pattern, are to select the security pattern from a plurality of security patterns configured on the in-vehicle communication network controller, each security pattern of the plurality of security patterns being associated with a respective security pattern identifier of a plurality of security pattern identifiers.

6. The in-vehicle communication network controller of claim 1, wherein the tunnel frame further includes a security pattern identifier corresponding to the security pattern.

7. The in-vehicle communication network controller of claim 1, wherein the one or more processors are further configured to determine a tunnel frame freshness value based on one or more message freshness values, wherein the generated tunnel frame further includes the tunnel frame freshness value.

8. The in-vehicle communication network controller of claim 1, wherein the one or more processors are further configured to encrypt a set of headers associated with the set of messages to generate a set of encrypted headers, wherein the generated tunnel frame further includes the set of encrypted headers.

9. The in-vehicle communication network controller of claim 1, wherein the set of messages includes two or more messages.

10. An in-vehicle communication network controller, comprising:
one or more memories;
one or more processors, coupled to the one or memories, configured to:
receive a set of messages provided by one or more network nodes included in an in-vehicle communication network;
determine a security pattern associated with generating a tunnel frame including the set of messages, wherein the security pattern includes a sequence of bits, and wherein each bit, in the sequence of bits, maps to a corresponding message in the set of messages, and wherein each bit, in the sequence of bits, indicates whether or not a characteristic of the corresponding message is to be used in association with computing a tunnel frame message authentication code (TMAC);
identify, based on the security pattern, one or more messages from the set of messages to be used in association with computing the TMAC;
compute the TMAC based on one or more characteristics of the one or more messages;
identify one or more message freshness values associated with determining a tunnel frame freshness value, the one or more message freshness values being included in a corresponding one or more messages of the set of messages;
determine the tunnel frame freshness value for a tunnel frame based on one or more message freshness values of the one or more message freshness values included in the corresponding one or more messages of the set of messages; and
generate the tunnel frame, the tunnel frame including the TMAC, the tunnel frame freshness value, and the set of messages.

11. The in-vehicle communication network controller of claim 10, wherein the one or more message freshness values are identified based on a timing of the tunnel frame.

12. The in-vehicle communication network controller of claim 10, wherein the one or more message freshness values comprise a single message freshness value and the tunnel frame freshness value is determined as the single message freshness value.

13. The in-vehicle communication network controller of claim 10, wherein the one or more processors are further configured to apply a tunnel frame freshness value function to the one or more message freshness values, wherein the tunnel frame freshness value is determined based on a result of applying the tunnel frame freshness value function to the one or more message freshness values.

14. The in-vehicle communication network controller of claim 10, wherein the one or more processors are further configured to apply a hash function to a message freshness value of the one or more message freshness values to generate a hashed message freshness value, wherein the tunnel frame freshness value is determined based on the hashed message freshness value.

15. The in-vehicle communication network controller of claim 10, wherein the one or more processors are further configured to encrypt a set of headers associated with the set of messages to generate a set of encrypted headers, wherein the generated tunnel frame further includes the set of encrypted headers.

16. The in-vehicle communication network controller of claim 10, wherein the tunnel frame freshness value is associated with a freshness of the tunnel frame.

17. The in-vehicle communication network controller of claim 10, wherein the set of messages includes two or more messages.

18. An in-vehicle communication network controller, comprising:
one or more memories;
one or more processors, coupled to the one or memories, configured to:
receive a set of messages provided by one or more network nodes included in an in-vehicle communication network;
determine a security pattern associated with generating a tunnel frame including the set of messages, wherein the security pattern includes a sequence of bits, and wherein each bit, in the sequence of bits, maps to a corresponding message in the set of messages, and wherein each bit, in the sequence of bits, indicates whether or not a characteristic of the corresponding message is to be used in association with computing a tunnel frame message authentication code (TMAC);
identify, based on the security pattern, one or more messages from the set of messages to be used in association with computing the TMAC;
compute the TMAC based on one or more characteristics of the one or more messages;
encrypt a set of headers associated with the set of messages to generate a set of encrypted headers associated with the set of messages,
each header in the set of headers being encrypted separately from other headers in the set of headers; and
generate a tunnel frame, the tunnel frame including the TMAC, the set of encrypted headers, and the set of messages.

19. The in-vehicle communication network controller of claim 17, wherein the one or more processors are further configured to apply a header encryption function to each header in the set of headers, wherein the set of encrypted headers is generated based on a result of applying the header encryption function to each header in the set of headers.

20. The in-vehicle communication network controller of claim 18, wherein a header in the set of headers is encrypted based on a lookup table that maps information included in the header to an encrypted header.

21. The in-vehicle communication network controller of claim 18, wherein a header in the set of headers is encrypted based on a pre-defined key associated with the header.

22. The in-vehicle communication network controller of claim 18, wherein at least one header in the set of headers is encrypted in parallel with at least one other header in the set of headers.

23. The in-vehicle communication network controller of claim 18, wherein the one or more processors are further configured to determine a tunnel frame freshness value based on one or more message freshness values, wherein the generated tunnel frame further includes the tunnel frame freshness value.

24. The in-vehicle communication network controller of claim 18, wherein the set of messages includes two or more messages.

* * * * *

UNITED STATES PATENT AND TRADEMARK OFFICE
CERTIFICATE OF CORRECTION

PATENT NO. : 12,476,959 B2
APPLICATION NO. : 18/065430
DATED : November 18, 2025
INVENTOR(S) : Anjana Ramamoorthy et al.

It is certified that error appears in the above-identified patent and that said Letters Patent is hereby corrected as shown below:

In the Claims

Claim 19:
Column 26, Line 59 change "claim 17, wherein the one or more processors are further" to --claim 18, wherein the one or more processors are further--

Signed and Sealed this
Sixth Day of January, 2026

John A. Squires
*Director of the United States Patent and Trademark Office*